United States Patent
Liu et al.

(10) Patent No.: US 12,235,914 B2
(45) Date of Patent: Feb. 25, 2025

(54) SYSTEMS AND METHODS FOR IMPROVING SEARCH RESULT PERSONALIZATION AND CONTEXTUALIZATION USING MACHINE LEARNING MODELS

(71) Applicant: Walmart Apollo, LLC, Bentonville, AR (US)

(72) Inventors: Jingbo Liu, Princeton, NJ (US); Jun Zhao, Jersey City, NJ (US); Zheng Yan, Short Hills, NJ (US); Weiqi Tong, Long Island City, NY (US); Nitin Shailesh Baliga, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/588,334

(22) Filed: Jan. 30, 2022

(65) Prior Publication Data
US 2023/0244727 A1 Aug. 3, 2023

(51) Int. Cl.
*G06F 16/9535* (2019.01)
*G06N 20/20* (2019.01)

(52) U.S. Cl.
CPC ......... *G06F 16/9535* (2019.01); *G06N 20/20* (2019.01)

(58) Field of Classification Search
CPC .......... G06F 16/9535; G06F 16/24578; G06N 20/20; G06N 20/00
See application file for complete search history.

(56) References Cited

U.S. PATENT DOCUMENTS

| | | | |
|---|---|---|---|
| 2015/0032767 A1* | 1/2015 | Gao | G06F 16/3338 707/765 |
| 2015/0058331 A1 | 2/2015 | Kulkarni et al. | |
| 2018/0217990 A1* | 8/2018 | Kumar | G06F 16/9535 |
| 2018/0218428 A1* | 8/2018 | Xie | G06Q 10/067 |
| 2020/0005149 A1 | 1/2020 | Ramanath et al. | |
| 2021/0110208 A1* | 4/2021 | Ahmadvand | G06F 16/9535 |

(Continued)

OTHER PUBLICATIONS

Liu, X., et al., "System Design of Extreme Multi-Label Query Classification Using a Hybrid Model," Proceedings of the SIGIR 2019 eCom workshop, Jul. 2019, Paris, France, published at http://ceur-ws.org (8 pgs) Jul. 2019.

*Primary Examiner* — Apu M Mofiz
*Assistant Examiner* — Oscar Wehovz
(74) *Attorney, Agent, or Firm* — BRYAN CAVE LEIGHTON PAISNER LLP

(57) ABSTRACT

Systems and methods including one or more processors and one or more non-transitory storage devices storing computing instructions configured to run on the one or more processors and cause the one or more processors to perform acts of: in response to receiving search queries at a search engine, storing search event data and ranking features in one or more databases; generating, using the search event data and the ranking features, a training dataset comprising training event samples; executing a hybrid labeling procedure that assigns labels to the training event samples based, at least in part, on individual engagement information associated with the training event samples; and training a personalized ranking model to rank search results using the training event samples and the labels. Other embodiments are disclosed herein.

20 Claims, 9 Drawing Sheets

(56) References Cited

U.S. PATENT DOCUMENTS

| | | | |
|---|---|---|---|
| 2021/0174164 A1* | 6/2021 | Hsieh | G06Q 30/0282 |
| 2021/0240722 A1* | 8/2021 | Puthenputhussery | G06F 16/24578 |
| 2021/0312237 A1* | 10/2021 | Duan | G06Q 30/02 |
| 2021/0406937 A1* | 12/2021 | Oh | G06N 20/20 |
| 2022/0171873 A1* | 6/2022 | Lundbæk | G06F 16/9538 |

* cited by examiner

| customer_id | store_id | query | item_id | orders | atcs | clicks |
|---|---|---|---|---|---|---|
| aaa | 100 | tv | 10001 | 0 | 0 | 1 |
| aaa | 100 | tv | 10002 | 1 | 1 | 1 |
| aaa | 100 | tv | 10003 | 0 | 0 | 0 |
| ... | ... | ... | ... | ... | ... | ... |
| bbb | 200 | tv | 10001 | 1 | 1 | 1 |
| bbb | 200 | tv | 10004 | 0 | 1 | 1 |
| bbb | 200 | tv | 10005 | 0 | 0 | 0 |

FIG. 5A

| query | item_id | feature_1 | feature_2 | feature_3 | feature_4 | feature_5 | ... |
|---|---|---|---|---|---|---|---|
| tv | 10001 | 0.15 | 2 | 1.8 | 0.5 | 0.2 | ... |
| tv | 10002 | 0.13 | 2 | 1.6 | 0.4 | 0.2 | ... |
| tv | 10003 | 0.12 | 2 | 1.5 | 0.4 | 0.19 | ... |
| ... | ... | ... | ... | ... | ... | ... | ... |
| tv | 10004 | 0.14 | 2 | 1.6 | 0.48 | 0.2 | ... |
| tv | 10004 | 0.1 | 1 | 1.4 | 0.3 | 0.16 | ... |
| tv | 10005 | 0.11 | 2 | 1.2 | 0.3 | 0.16 | ... |

503 — query
504 — item_id
432A — feature_1, 432B — feature_2, 432C — feature_3, 432D — feature_4, 432E — feature_5, ... 432N
432 — Ranking Features
500B

FIG. 5B

| customer_id | store_id | query | item_id | orders | atcs | clicks | label |
|---|---|---|---|---|---|---|---|
| aaa | 100 | tv | 10001 | 0 | 0 | 1 | 8 |
| aaa | 100 | tv | 10002 | 1 | 1 | 1 | 82 |
| aaa | 100 | tv | 10003 | 0 | 0 | 0 | 5 |
| aaa | 100 | tv | 10004 | 0 | 0 | 0 | 3 |
| aaa | 100 | tv | 10005 | 0 | 0 | 0 | 1 |
| aaa | 100 | tv | 10006 | 0 | 0 | 0 | 1 |
| aaa | 100 | tv | 10007 | 0 | 0 | 0 | 0 |
| aaa | 100 | tv | 10008 | 0 | 0 | 0 | 0 |
| aaa | 100 | tv | 10009 | 0 | 0 | 0 | 0 |

550 – Individual Engagement Information

- 710– Storing search event data and ranking features in one or more databases in response to receiving search queries at a search engine

- 720– Generating a training dataset comprising training event samples using the search event data and ranking features

- 730– Executing a hybrid labeling procedure that assigns labels to the training event samples based on individual engagement information associated with the training event samples

- 740– Utilizing relevance scores to adjust labels for training event samples that corresponds to tail queries

- 750– Training a personalized ranking model to rank search results using the training event samples and the labels

FIG. 7

SYSTEMS AND METHODS FOR IMPROVING SEARCH RESULT PERSONALIZATION AND CONTEXTUALIZATION USING MACHINE LEARNING MODELS

TECHNICAL FIELD

This disclosure relates generally to machine learning techniques for ranking search results.

BACKGROUND

Search engines are commonly used to identify and present items included in an online catalog. Users can submit search queries to a search engine to search for desired items. In many cases, there may be large numbers of search results that match a given search query. It can be important to present the most relevant search results near the top or beginning of the search result listings to avoid wasting a user's time and effort in identifying desired items (e.g., to avoid excessive scrolling or navigating on interfaces).

In many scenarios, users who submit the same search query may have different intents or preferences. For example, even though users may submit an identical search query, the actual items being sought by those users may vary. Nevertheless, traditional search engines will present the users with the same search results without accounting for the users individual preferences.

BRIEF DESCRIPTION OF THE DRAWINGS

To facilitate further description of the embodiments, the following drawings are provided in which:

FIG. 5A is a table illustrating exemplary search event data, according to an embodiment;

FIG. 5B is a table illustrating exemplary ranking features, according to an embodiment;

FIG. 5C is a table illustrating labels assigned to training event samples, according to an embodiment;

FIG. 7 illustrates a flowchart for a method, according to an embodiment.

Figure 1:
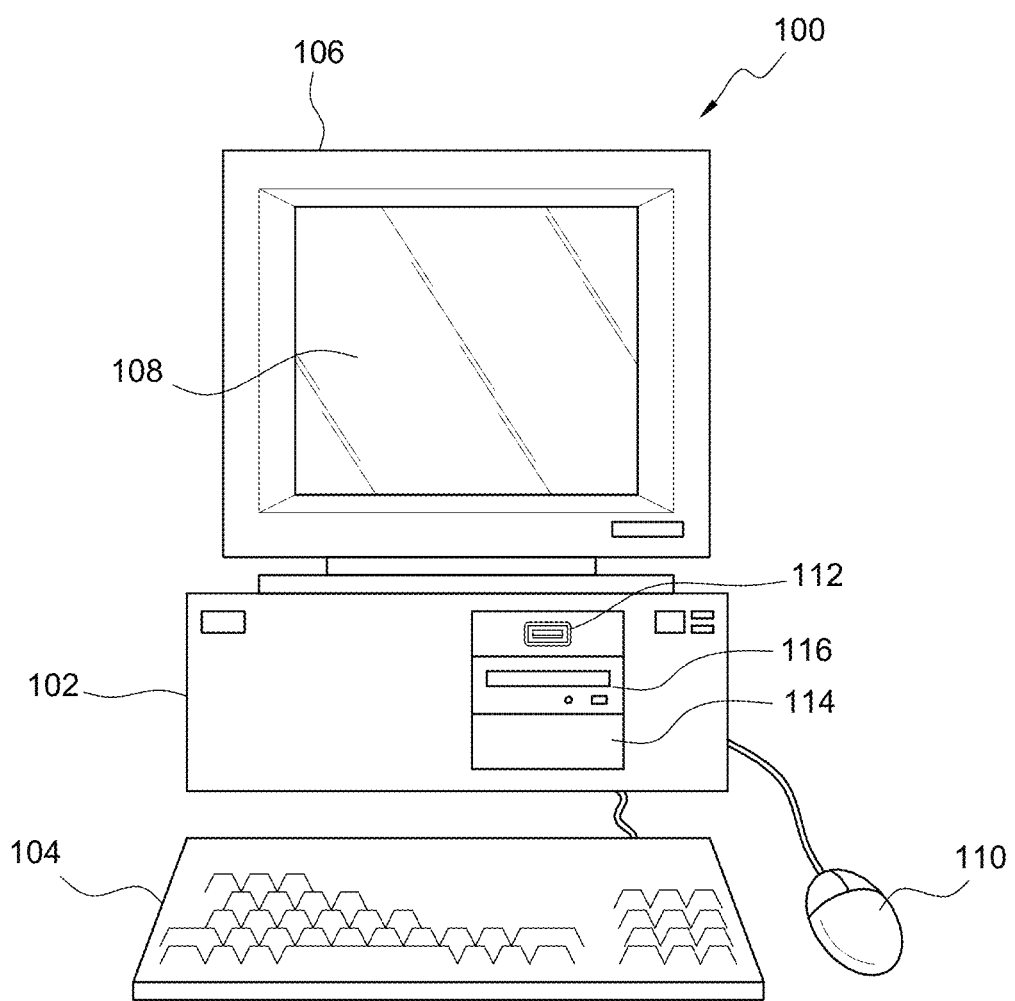
FIG. 1 illustrates a front elevational view of a computer system that is suitable for implementing various embodiments of the systems disclosed in FIGS. 3 and 4.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information.

Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and cause the one or more processors to perform acts of: in response to receiving search queries at a search engine, storing search event data and ranking features in one or more databases; generating, using the search event data and the ranking features, a training dataset comprising training event samples; executing a hybrid labeling procedure that assigns labels to the training event samples based, at least in part, on individual engagement information associated with the training event samples, wherein executing the hybrid labeling procedure comprises: (a) applying a first set of labels to a first portion of the training event samples determined to have positive engagement, the first set of labels being assigned to the training event samples based on engagement activity types; and (b) applying a second set of labels to a second portion of the training event samples that have negative engagement, the second set of labels being assigned to the training event samples based on aggregated engagement information; and training a personalized ranking model to rank search results using the training event samples and the labels.

Various embodiments include a method. The method can be implemented via execution of computing instructions configured to run at one or more processors and configured to be stored at non-transitory computer-readable media The method can comprise: in response to receiving search queries at a search engine, storing search event data and ranking features in one or more databases; generating, using the search event data and ranking features, a training dataset comprising training event samples; executing a hybrid labeling procedure that assigns labels to the training event samples based, at least in part, on individual engagement information associated with the training event samples, wherein executing the hybrid labeling procedure comprises: (a) applying a first set of labels to a first portion of the training event samples determined to have positive engagement, the first set of labels being assigned to the training event samples based on engagement activity types; and (b) applying a second set of labels to a second portion of the training event samples that have negative engagement, the second set of labels being assigned to the training event samples based on aggregated engagement information; and training a personalized ranking model to rank search results using the training event samples and the labels.

Figure 2:
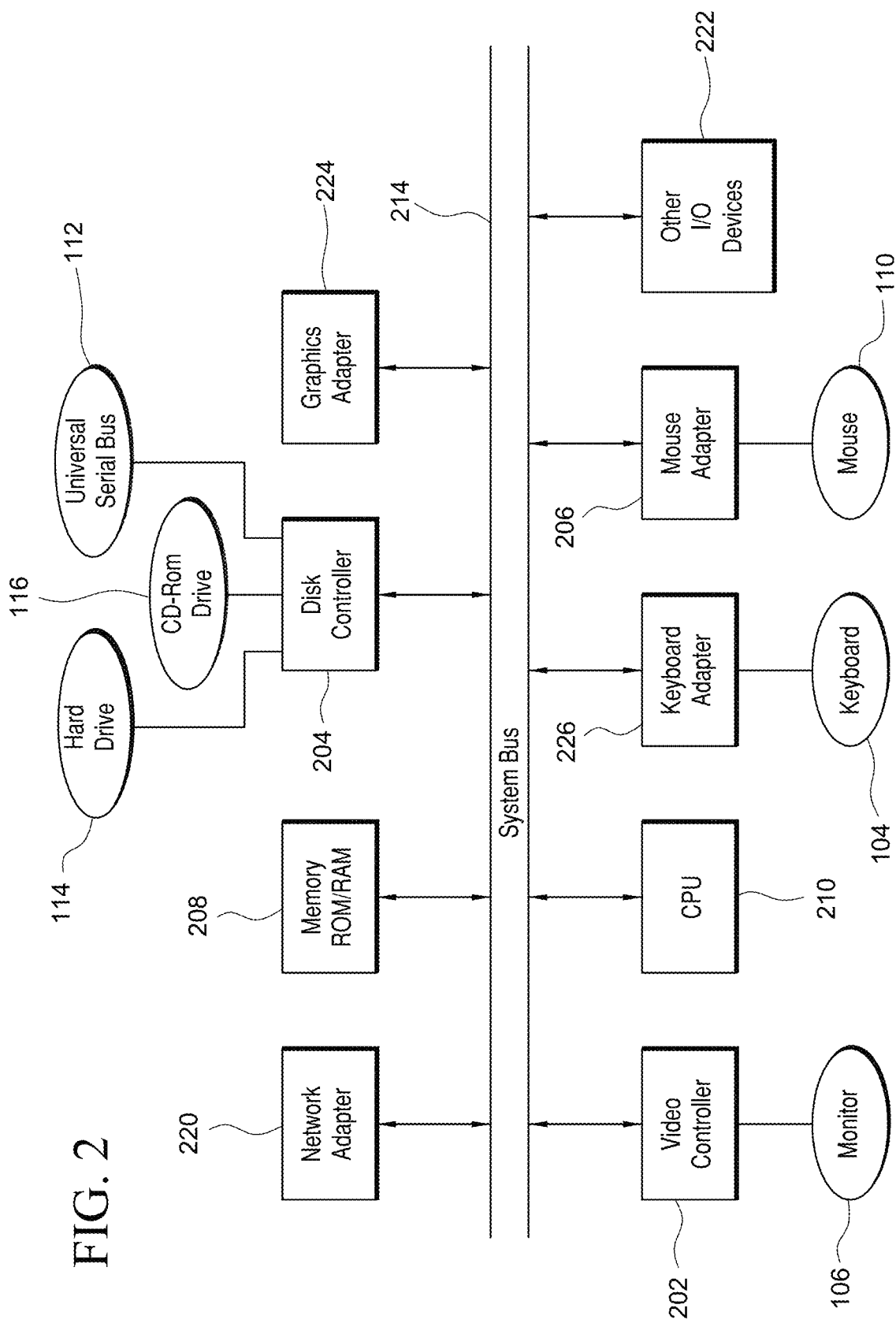
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module (s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
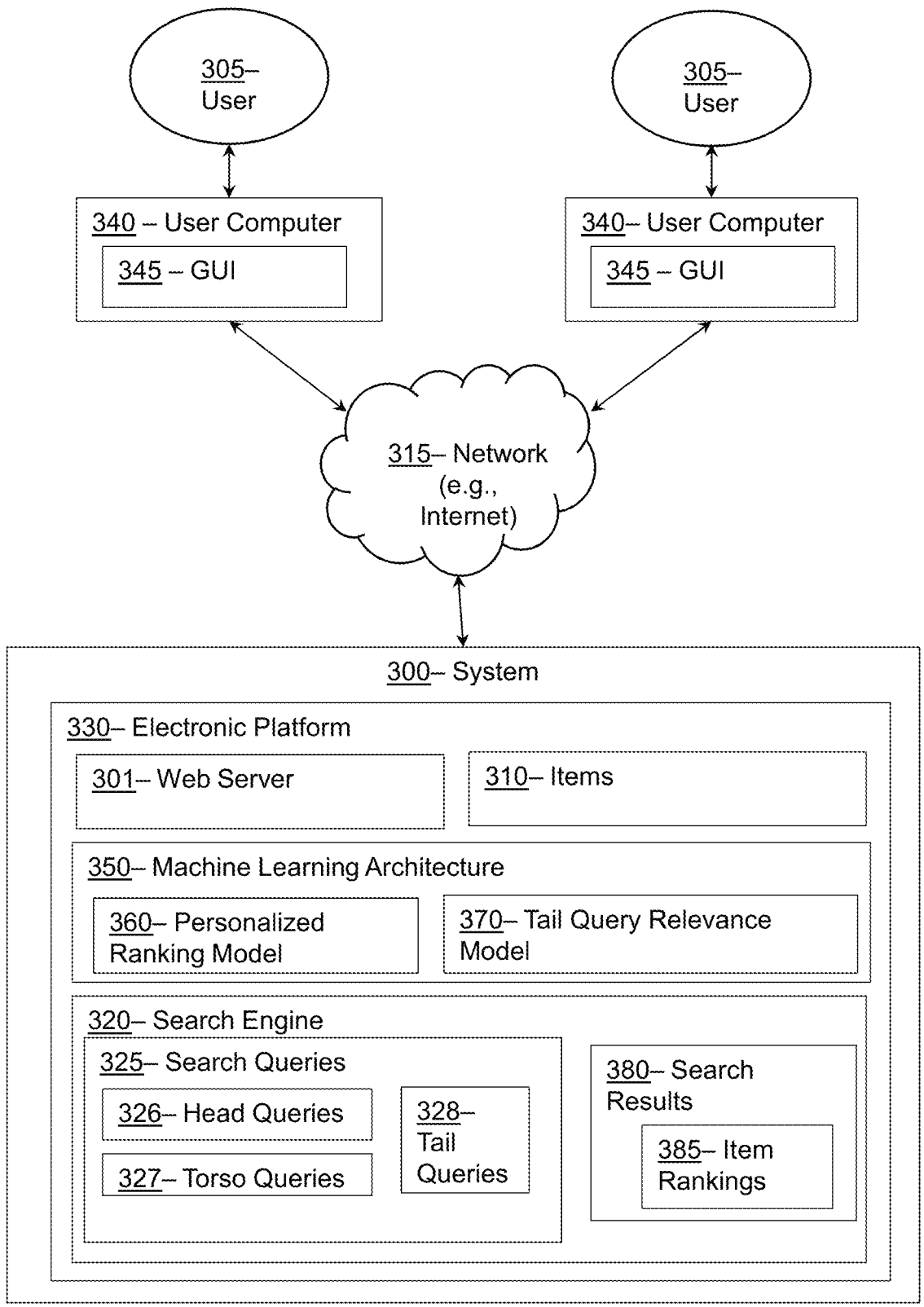
FIG. 3 illustrates a representative block diagram of a system, according to an embodiment.

Turning ahead in the drawings, FIG. 3 illustrates a block diagram of a system 300 that can be configured to improve personalization and contextualization of search results, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 301, a search engine 320, an electronic platform 330, a machine learning architecture 350, a personalized ranking model 360, and/or a tail query relevance model 370. Web server 301, search engine 320, electronic platform 330, machine learning architecture 350, personalized ranking model 360, and/or tail query relevance model 370 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 301, search engine 320, electronic platform 330, machine learning architecture 350, personalized ranking model 360, and tail query relevance model 370. Additional details regarding web server 301, search engine 320, electronic platform 330, machine learning architecture 350, personalized ranking model 360, and tail query relevance model 370 are described herein.

In many embodiments, system 300 also can comprise user computers 340. User computers 340 can comprise any of the elements described in relation to computer system 100. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interfaces ("GUIs") 345. In the same or different embodiments, GUIs 345 can be part of and/or displayed by computing devices associated with system 300 and/or user computers 340, which also can be part of system 300. In some embodiments, GUIs 345 can comprise text and/or graphics (images) based user interfaces. In the same or different embodiments, GUIs 345 can comprise a heads up display ("HUD"). When GUIs 345 comprise a HUD, GUIs 345 can be projected onto glass or plastic, displayed in midair as a hologram, or displayed on monitor 106 (FIG. 1). In various embodiments, GUIs 345 can be color or black and white. In many embodiments, GUIs 345 can comprise an application running on a computer system, such as computer system 100, user computers 340, and/or one or more server computers (e.g., one or more server computers that host all or a portion of system 300). In the same or different embodiments, GUI 345 can comprise a website accessed through network 315 (e.g., the Internet). In some embodiments, GUI 345 can comprise an eCommerce website. In the same or different embodiments, GUI 345 can be displayed as or on a virtual reality (VR) and/or augmented reality (AR) system or display.

In some embodiments, web server 301 can be in data communication through network 315 (e.g., the Internet) with user computers (e.g., 340). In certain embodiments, the network 315 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. In certain embodiments, user computers 340 can be desktop computers, laptop computers, smart phones, tablet devices, and/or other endpoint devices. Web server 301 can host one or more websites. For example, web server 301 can host an eCommerce website that allows users to browse and/or search for products, to add products to an electronic shopping cart, and/or to purchase products, in addition to other suitable activities.

In many embodiments, web server 301, search engine 320, electronic platform 330, machine learning architecture 350, personalized ranking model 360, and/or tail query relevance model 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of web server 301, search engine 320, electronic platform 330, machine learning architecture 350, personalized ranking model 360, and/or tail query relevance model 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of the web server 301, search engine 320, electronic platform 330, machine learning architecture 350, personalized ranking model 360, and/or tail query relevance model 370. In a similar manner, the processing module(s) and the memory storage module(s) can be local and/or remote to each other.

In many embodiments, web server 301, search engine 320, electronic platform 330, machine learning architecture 350, personalized ranking model 360, and/or tail query relevance model 370 can be configured to communicate with one or more user computers 340. In some embodiments, user computers 340 also can be referred to as customer computers. In some embodiments, web server 301, search engine 320, electronic platform 330, machine learning architecture 350, personalized ranking model 360, and/or tail query relevance model 370 can communicate or interface (e.g., interact) with one or more customer computers (such as user computers 340) through a network 315 (e.g., the Internet). Network 315 can be an intranet that is not open to the public. Accordingly, in many embodiments, web server 301, search engine 320, electronic platform 330, machine learning architecture 350, personalized ranking model 360, and/or tail query relevance model 370 (and/or the software used by such systems) can refer to a back end of system 300 operated by an operator and/or administrator of system 300, and user computers 340 (and/or the software used by such systems) can refer to a front end of system 300 used by one or more users 305, respectively. In some embodiments, users 305 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 301, search engine 320, electronic platform 330, machine learning architecture 350, personalized ranking model 360, and/ or tail query relevance model 370 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 301, search engine 320, electronic platform 330, machine learning architecture 350, personalized ranking model 360, and/ or tail query relevance model 370, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In certain embodiments, users 305 may operate user computers 340 to browse, view, purchase, and/or order items 310 via the electronic platform 330. For example, the electronic platform 330 may include an eCommerce website that enables users 305 to add items 310 to a digital shopping cart and to purchase the added items 310. The items 310 made available via the electronic platform 330 may generally relate to any type of product and/or service including, but not limited to, products and/or services associated with groceries, household products, entertainment, furniture, apparel, kitchenware, electronics, fashion, appliances, sporting goods, etc.

The electronic platform 330 may store taxonomy information associated with the classifying the items 310 that are offered through the electronic platform 330. For example, the taxonomy information can include a hierarchy of categories and sub-categories, and each item 310 included in an online catalog can be associated with one or more the categories and sub-categories. High-level categories may include broad labels such as "Beauty," "Clothing, Shoes, & Accessories," "Sports & Outdoors," etc. One or more lower-level categories may segment each of the high-level categories into more specific categories.

Electronic platform 330 can include a search engine 320 that enables users 305 to search for, or identify, items 310. Users can be presented with GUIs 345 that enable the users to submit search queries 325 to the search engine 320. In certain embodiments, the search queries 325 may represent text strings. The search engine 320 can identify search results 380, at least in part, by matching the text strings submitted with the search queries to metadata associated with items 310 in an online catalog. Each of the search results 380 can correspond to an item 380 included in an online catalog associated with the electronic platform. The search results 380 can be assigned item rankings 385 that determine how the search results are ordered, sorted, and/or ranked when they are presented to users 305. Users 305 can utilize GUIs 345 to view the search results 380, select items 310 included in the search results 380 and, if desired, to add the items 310 to a digital shopping cart and/or initiate purchasing of the items 310.

In certain embodiments, the search queries 325 received by the search engine 320 can include head queries 326, torso queries 327, and tail queries. Head queries 326 can generally represent search queries 325 that are frequently received by the search engine 320 and/or which comprise the largest volume of search queries 325. Conversely, tail queries 328 generally represent search queries 325 that are not frequently received by the search engine 320 and/or which comprise the smallest volume of search queries 325. Torso queries 327 generally represent search queries 325 that occur frequently enough so that they are not considered tail queries 328, but not frequently enough to be head queries 326 either.

When the search engine 320 receives a search query 325, the search engine 320 can determine whether the search query 325 is a head query 326, torso query 327, or tail query 328. As explained in further detail below, this determination can be utilized to adjust how search results 380 are ranked and displayed to users 305.

The machine learning architecture 350 can comprise one or more learning models that are configured to optimize the ranking of items 310 included in the search results 380. In certain embodiments, the one or more learning models can be trained to personalize the ranking of items 310 for each user based, at least in part, on predicted user preferences. In many cases, the one or more learning models can be trained to personalize the search results 380 on an individual user basis (e.g., specifically for each user).

The configuration of the machine learning architecture 350 can vary. The machine learning architecture 350 can include one or more machine learning models and/or artificial neural network models that are configured to execute deep learning functions, artificial intelligence (AI) functions, machine learning functions and/or other functions to perform the functions described herein. Exemplary configurations for the machine learning architecture 350 are described in further detail below. Regardless of the how the machine learning architecture 350 is configured, the machine learning architecture 350 can be configured to enhance or optimize the ranking of items 310 included in search results 380 based on both individual user preferences and global item popularity.

In certain embodiments, the machine learning architecture 350 comprises a personalized ranking model 360 and a tail query relevance model 370. In general, the personalized ranking model 360 can be trained to predict the item rankings 385 for search results 380 based on individual user preferences and global item popularity. Additionally, the personalized ranking model 360 can leverage relevance scores generated by the tail query relevance model 370 to assist with ranking search results 380 generated in response to tail queries 328.

As explained in further detail below, the personalized ranking model 360 can be trained, at least in part, using raw search event data that indicates, inter alia, previous engagement activities for each user (e.g., indicating previous selections of items, previous add-to-cart events, and/or previous orders or transactions conducted) and/or other contextual information. However, the raw search event data can be noisy, and training the personalized ranking model 360 purely with the raw search event data can lead to suboptimal item rankings 385. To account for such noise, the training data also can include global features or data indicating aggregated engagement with items 380 (e.g., indicating global item popularity and/or preferences across all or a plurality of users). Leveraging both the raw search event data and global features during training enables the personalized ranking model 360 to accurately predict an ideal item ranking 385 for each search result 380 based on both individual user preferences and global item popularity. Further details regarding the training of the personalized ranking model 360 are provided below.

The configuration of the personalized ranking model 360 can vary. In certain embodiments, the personalized ranking model 360 can be implemented using a gradient boosting model (e.g., a gradient boosting tree or GBT model) and/or other deep learning model. For example, in some cases, the personalized ranking model 360 can utilize a version of XGBoost, which provides a regularizing gradient boosting learning framework. Pairwise ranking can be utilized as the objective function to facilitate the ranking of items 310 included in a set of search results 380. The personalized ranking model 360 can be trained using supervised, semi-supervised, and/or unsupervised training procedures. For example, in some cases, the personalized ranking model 360 can be trained using a supervised training procedure that uses labeled training samples as described below.

In certain embodiments, the machine learning architecture 350 further comprises a tail query relevance model 370. The tail query relevance model 370 can be configured to execute functions that further optimize rankings 385 of items 310 to account for search results 380 identified in response to receiving tail queries 328. During training, labels can be assigned to training samples, and relevance scores generated by the tail query relevance model 370 can be applied to adjust the labels for training samples that are associated with tail queries 328.

The configuration of the tail query relevance model 370 can vary. In certain embodiments, the tail query relevance model 370 can be implemented using a gradient boosting model (e.g., a GBT model) and/or another deep learning model. For example, in some cases, the tail query relevance model 370 can utilize a binary classifier provided by a version of XGBoost to generate the relevance scores. Further details of the tail query relevance model 370 are described below.

After the learning models (e.g., the personalized ranking model 360 and tail query relevance model 370) of the machine learning architecture 350 are trained, they may be deployed and/or incorporated into the electronic platform 330 to enhance generation of search results by the search engine 320. The search engine 320 may generally represent any application, program, and/or feature that is configured to search for items 380 included in database and/or online catalog in response to receiving user queries 325.

During run time, search engine 380 can receive search queries 325 submitted by users 305 and leverage the learning models included in the machine learning architecture 350 to personalize the ranking of search results 380. For example, in response to receiving a search query 380, the search engine 320 may initially identify a subset of potentially relevant items 310 (e.g., by matching one or more terms included in the search query 325 with metadata associated with the items 310). The learning models (e.g., the personalized ranking model 360 and tail query relevance model 370) can then determine item rankings 385 for each of the identified items using the techniques described herein. Thereafter, a GUI 345 displayed to the user 305 can present the items 310 in the search results 380 in a sequence or order that is based on the item rankings 385. Items 310 that are predicted to be of greater interest to the user 305 will appear higher in the search results 380 and/or closer to the beginning of the search results 380. Items 310 predicted to be of lesser interest to the user 305 will be appear lower in the search results 380 (and/or closer to the end of the search results 380).

Configuring the machine learning architecture 350 (or related learning models) to personalize rankings of search results 380 on an individual basis provides various advantages. One advantage is that the relevancy of the search results 380 presented to users is greater in comparison to other techniques (e.g., such as techniques that attempt to personalize search results based purely on aggregated user preferences across all users). Another advantage is that users save time and effort with respect to identifying desired items 310 in the search results 380 because the most relevant items 310 appear near the top or beginning of the search result listings. Moreover, users are not required to excessively scroll through the search results, or navigate through several interfaces to identify the most relevant or desired items 310. Other advantages include improved user experiences, greater customer retention, and higher conversion rates.

Figure 4:
FIG. 4 illustrates a representative block diagram of a portion of the system of FIG. 3, according to an embodiment.

FIG. 4 is a block diagram illustrating a detailed view of an exemplary system 300 in accordance with certain embodiments. The system 300 includes one or more storage modules 401 that are in communication with one or more processing modules 402. The one or more storage modules 401 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage modules 401 can comprise (i) non-transitory memory and/or (ii) transitory memory. The one or more processing modules 402 can include one or more central processing units (CPUs), graphical processing units (GPUs), controllers, microprocessors, digital signal processors, and/or computational circuits. The one or more storage modules 401 can store data and instructions associated with providing an electronic platform 330, machine learning architecture 350 (and associated sub-components), and search engine 320. The one or more processing modules 402 can be configured to execute any and all instructions associated with implementing the functions performed by these components. Exemplary configurations for each of these components are described in further detail below.

The exemplary electronic platform 330 of system 300 includes one or more databases 410. The one or more databases 410 store data and information related to items 310 (e.g., products and/or services) that are offered or made available via the electronic platform 330. For example, for each item 310, metadata 415 associated with the item 310 can include any or all of the following: a name or title, an item category (or categories) associated with the item, a price, one or more customer ratings for the item, an item description, images corresponding to the item, and various other data associated with the item 310.

The one or more databases 410 also may store historical search data 490. The historical search data 490 can generally include any data associated with previous search queries 325 submitted by users 305. For example, in some cases, the historical search data 490 can include search event data 431 and ranking features 432 associated with previous search queries 325. The search event data 431 may include the raw data that is saved by the electronic platform 330 and/or search engine 320 in response to submissions of search queries 325. The ranking features 432 can include data or features that were used to rank the search results 380 at the time the search queries was submitted.

FIG. 5A is a table 500A that illustrates exemplary search event data 431 that may be stored in the historical search data 490 (FIGS. 3 and 4). For each previously submitted search query 325 (FIGS. 3 and 4), the search event data 431 includes a separate record 520 for each item 380 (FIGS. 3 and 4) that was presented in a listing of search results 380 (FIGS. 3 and 4). These records 520 are illustrated as separate rows in the table 500A.

The table 500A includes a customer identifier (ID) column 501, store ID column 502, query column 503, item ID column 504, order event column 505, add-to-cart event column 506, and a click event column 506. The customer ID column 501 includes an identifier that uniquely identifies a user or customer that submitted a search query 325 (FIGS. 3 and 4). The store ID column 502 identifies a physical store that is associated with the customer (e.g., a physical store location that is frequented by the user and/or located near the user). The query column 503 identifies the search query (e.g., an alphanumerical string) that was submitted. The item ID column 504 includes an identifier that uniquely identifies an item 310 that was presented in search results 380 (FIGS. 3 and 4) that were generated in response to the corresponding search query 325 (FIGS. 3 and 4). The order event column 505 indicates whether the user or customer ordered or purchased the corresponding item 310 (FIGS. 3 and 4). The add-to-cart event column 306 (FIGS. 3 and 4) indicates whether the user or customer added the corresponding item 310 (FIGS. 3 and 4) to a digital shopping cart. The click event column 506 indicates whether the user or customer selected (e.g., using a mouse device and/or tap gesture) the item 310 (FIGS. 3 and 4) and/or viewed details relating to the corresponding item 310 (FIGS. 3 and 4).

The order event column 505, add-to-cart event column 306, and click event column 506 collectively specify individual engagement information 550, which indicates whether or not a user interacted or engaged the corresponding item 310 (FIGS. 3 and 4) presented in the search results 380 (FIGS. 3 and 4). As explained in further detail below, the training procedure 440 (FIG. 4) applied to the learning models may determine if there is a positive engagement 541 or negative engagement 542 for each of a plurality of training samples that comprise data derived from the records 520. A positive engagement 541 may be detected if a user interacted with an item 310 (FIGS. 3 and 4) (e.g., selected, viewed, ordered, purchased, and/or added the item to an electronic shopping cart) in a corresponding record. A negative engagement 542 may be detected if a user did not interact with the item (e.g., did not select, view, order, purchase, or add to an electronic shopping cart).

As explained in further detail below, the raw information included in the records 520 of the search event data 431 can be utilized, at least in part, to generate a training dataset 445 (FIG. 4) for training the personalized ranking model 360 (FIGS. 3 and 4) of the machine learning architecture 350 (FIGS. 3 and 4). As demonstrated below, the records 520 included in the search event data 431 also can be supplemented, or combined, with ranking features 432 (FIG. 4) that are included in the training dataset (FIG. 4).

FIG. 5B is a table 500B that illustrates exemplary ranking features 432 that may be combined with, or included in, the records 520 pertaining to previous search queries 325 (FIGS. 3 and 4). In certain embodiments, the ranking features 432 can be stored separately from the search event data 431 (FIGS. 4 and 5A) at that time when search queries 325 are submitted. Prior to training the learning models of the machine learning architecture, the records 520 in the search event data 431 (FIGS. 4 and 5A) can be supplemented with the ranking features 432 when a training procedure 440 (FIG. 4) is being executed to compile a training dataset 450 (FIG. 4).

The table 500B includes a separate column (432A, 432B, 432C, 432D, 432E . . . 432N) for each ranking feature 432. In each column, corresponding values for the ranking features 432 are specified. Each record 520 is supplemented with the ranking feature values that were utilized to rank or generate the search results when the corresponding search query was submitted.

The types of ranking features 432 can vary. In certain embodiments, the ranking features 432 utilized by the search engine 320 can include one or more of the following:

1) Click engagement features 621 (FIG. 6): This indicates or predicts a global popularity of an item in a corresponding record 520 based on global user engagement (e.g., based on global views, add-to-carts, and/or orders).
2) Localized engagement features 622 (FIG. 6): This indicates or predicts the popularity of an item in a particular market area and/or geographic location based on user engagement (e.g., based on views, add-to-carts, and/or orders in that area or location);
3) Brand affinity features 623 (FIG. 6): This indicates or predicts the affinity or likeness of a brand or company that provides an item in a corresponding record 520. Brand affinity features can be provided on an individual basis (e.g., for the specific user identified in a record 520) and/or on a global basis (e.g., based on aggregated data across global users).
4) Price affinity features 624 (FIG. 6): This indicates or predicts the affinity or likeness to the price (or price range) of an item included in a corresponding record 520. Price affinity features can be provided on an individual basis (e.g., for the specific user identified in a record 520) and/or on a global basis (e.g., based on aggregated data across global users).
5) Title similarity feature 625 (FIG. 6): This indicates the similarity or closeness between the search query and item title in a corresponding record 520.

The above features are exemplary ranking features 432 that may be utilized by a search engine 320 (FIGS. 3 and 4) to rank items 310 (FIGS. 3 and 4) included in search results 380 (FIGS. 3 and 4). Many additional or alternative ranking features also may be utilized or considered to determine item rankings.

Returning to FIG. 4, the search event data 431 and ranking features 432 can be used to generate a training dataset 445. The training dataset 432 can comprise a plurality of training event samples 446, each of which corresponds to a record 520 (FIGS. 5A and 5B) from that search event data 431 that is supplemented with ranking features 432. Thus, in certain embodiments, each training event sample 446 can identify, inter alia: a search query 325 that was previously submitted; the user that submitted the search query; a particular item 310 that was included in search results 380 produced in response to the search query 325; a store identifier; individual engagement information 550 corresponding to the item 310 (e.g., indicating whether the item 310 was viewed, ordered, and/or added to a digital shopping cart); and ranking features 432 that were utilized at the time when the search query 325 submitted.

Traditional ranking techniques do not utilize granular information that identifies whether each user interacted with a particular item 310 presented in a set of search results 380. Consequently, traditional techniques are not able to personalize item rankings 385 on an individual basis with high precision. This granular information can be used to train the personalized ranking model 360 of the machine learning architecture 350 to optimize item rankings 385 in a manner that accounts for each user's individual preferences. Moreover, global features indicating the overall popularity of items 380 also can be used during training to mitigate noise associated with the raw search data used to personalize the search results.

Prior to training, labels 447 can be assigned to, or associated with, each of the training event samples 446 in order to aid the learning process. In general, the labels 447 assigned to the training event samples 446 can represent ranking scores that indicate or predict the users' preferences for corresponding items 310, whereby greater scores indicate a higher likelihood that users will desire or prefer the items 310 and lower scores indicate a lesser likelihood that users will desire or prefer the items 310.

A training procedure 440 can be executed to assign the labels 447 to the training event samples 446, and train the personalized ranking model 360 with the training event samples 446 and labels 447. In certain embodiments, the training procedure 440 executes a hybrid labeling procedure 441 to assign the labels 447 to the training event samples 446. In assigning labels 447 to the training event samples 446, the hybrid labeling procedure 441 relies, at least in part, on the individual engagement information 550 (FIG. 5A) derived from the raw search event data to personalize item rankings. While this raw search event data advantageously allows for personalization of search results 380 on an individual user basis, the raw search event data can be noisy and training the personalized ranking model 360 purely with such data may not be optimal. To account for this noise, the hybrid labeling procedure 441 can leverage the ranking features 432 included with the training event samples 446 to permit the global popularity of items to be considered in the ranking procedure.

Figure 6:
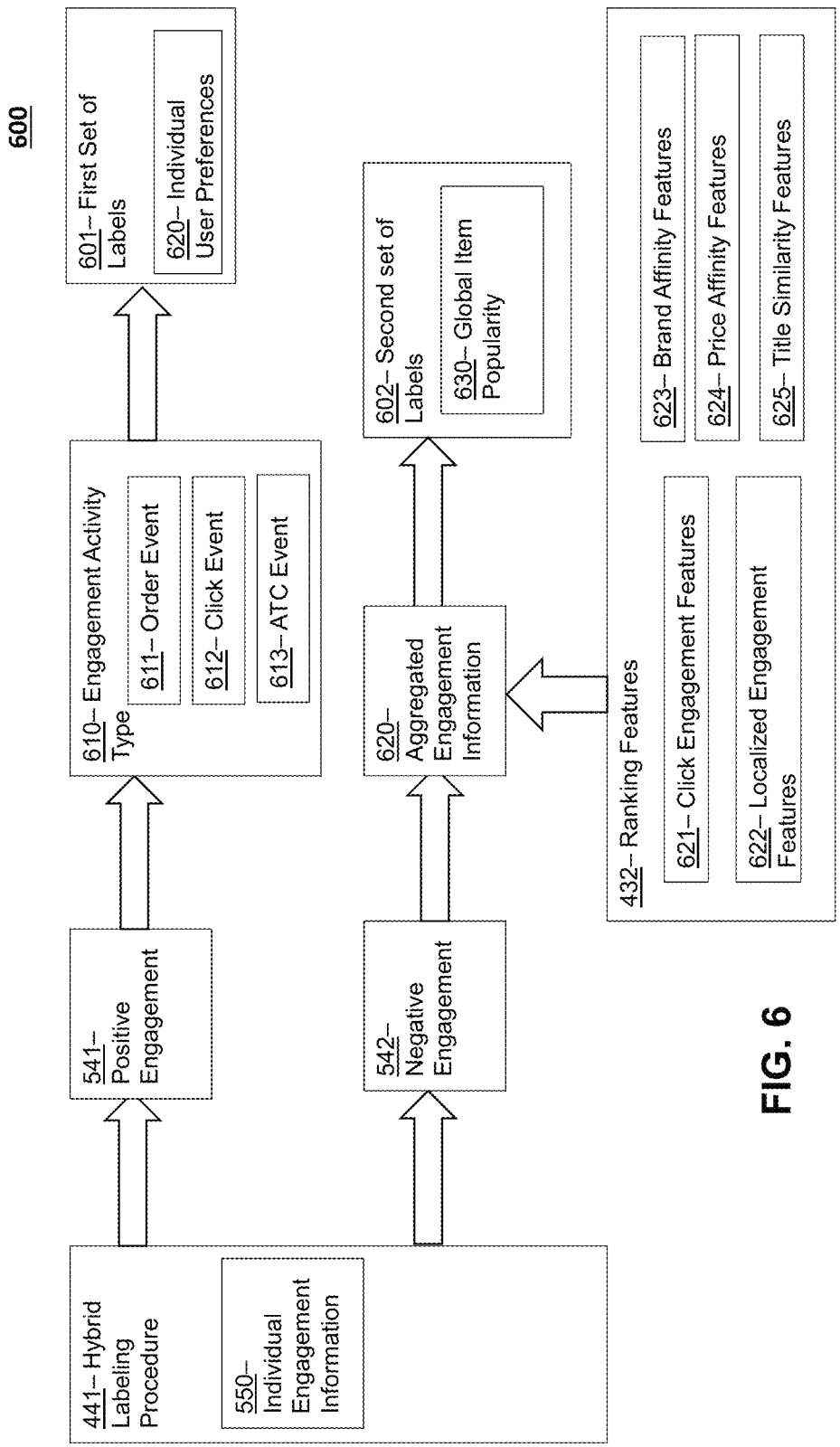
FIG. 6 is a block diagram illustrating a process flow for a hybrid labeling procedure, according to an embodiment.

FIG. 6 is a block diagram illustrating an exemplary process 600 illustrating how the hybrid labeling procedure 441 can assign labels 447. In certain embodiments, executing the hybrid labeling procedure 441 includes analyzing the individual engagement information 550 included with each training event sample 446 to determine if there was positive engagement 541 or negative engagement 542 with an item 310 corresponding to the training event sample. The hybrid labeling procedure 441 may determine that there was positive engagement 541 with the item 310 if the user identified in the training event sample 446 selected, viewed, ordered, purchased, and/or added the item to a digital shopping cart. The hybrid labeling procedure 441 may determine that there was negative engagement 541 with the item 310 if the user did not select, view, order, purchase, and/or add the item to a digital shopping cart.

The hybrid labeling procedure 441 can assign a first set of labels 601 to training event samples that are determined to have positive engagement 541. The first set of labels 601 can enable the personalized ranking model to learn or understand individual user preferences 620 for each user 305. In some cases, the first set of labels 601 can be explicit values (e.g., 8, 16, and 32) that are assigned based on engagement activity types 610. Exemplary engagement activity types 610 can include:
  a) order events 611 (e.g., indicating whether a user purchased or ordered an item identified in a corresponding training event sample);
  b) click events 612 (e.g., indicating whether a selected or viewed details relating to an item identified in a corresponding training event sample); and
  c) add to cart (ATC) events 613 (e.g., indicating whether a user added an item identified in a corresponding training event sample to a digital shopping cart).

The hybrid labeling procedure 441 can assign a second set of labels 602 to training event samples 446 that are determined to have negative engagement 542. The second set of labels 602 can determined based on aggregated engagement information 620 for the items 310 across global users. The second set of labels 602 can enable the personalized ranking model to learn or understand global item popularity 630 for items 310. In some embodiments, the aggregated engagement information 620 can be derived from ranking features 432 including, but not limited to, the click engagement features 621, localized engagement features 622 described above. These ranking features 432 can be utilized to generate a label value that reflects the aggregated level of engagement with the item.

Advantageously, the training event samples 446 having negative engagement 542 are not eliminated from the search results 380—rather, they may be assigned lower values and given less weight in comparison to the training samples having positive engagement 541. Labeling the training event samples 446 in this manner reduces the noise associated with the raw search event data and can improve the learning of the personalized ranking model 360.

FIG. 5C is an exemplary table 500C illustrating how labels 447 can be assigned to training event samples 446 according to certain embodiments. Each row in the table corresponds to a separate training event sample 446. It should be noted that table 500C shows a portion of data that may be included with training event samples 446. As mentioned above, the training event samples 446 can include additional information (e.g., ranking features) that is not illustrated in the table 500C.

The hybrid labeling procedure 441 (FIG. 4) is executed to assign labels 447 to each of the training event samples 446. The training event samples 446 that have positive engagement (such as the two located at the top of the table) can be assigned one of three explicit values (8, 16, or 32) based engagement activity types 610 (FIG. 6). For example, each training event sample 446 may be assigned a label of "32" if a corresponding item 310 associated with the training event sample 446 was ordered or purchased. Items that were added to an electronic shopping cart (but not purchased) may be assigned a label of "16", and items 310 that were only selected or viewed (but not ordered or added to carts) may be assigned a label of "8". Thus, for training event samples 446 having positive engagement, explicit values can be assigned which reflect the level of engagement or engagement activity types 610. The particular values (8, 16, and 32) illustrated in table 500C are used as examples, and any appropriate values may alternatively be used.

Box A in FIG. 5C illustrates seven training event samples 446 that have negative engagement. The labels 447 assigned to these training event samples 446 can be based on global or aggregated user engagement with the corresponding items identified in each of these training event samples 446 (e.g., based on global popularity of the item and/or how frequently the item is engaged by users on a global scale). Items having greater global engagement will be assigned greater label values, which will cause them to appear higher in the item rankings relative to other items having lower global engagement.

In some embodiments, the values of labels assigned to training event samples 446 having negative engagement may generally be lower than the values of training event samples 446 having positive engagement.

Returning to FIG. 4, after the training event samples 446 are assigned labels 447, the training procedure 440 utilizes the training event samples 446 to train the personalized ranking model 360. In some embodiments, the personalized ranking model 360 can include a GBT model 461 that utilizes pairwise ranking as an objective function, and the objective function can be trained with the training event samples 446 to predict optimal item rankings 385. The labels 447 assigned to the training event samples 446 aid the personalized ranking model 360 in understanding how to determine or predict the item rankings 385.

The training of the personalized ranking model 360 can further be improved by leveraging relevance scores 471 generated by the tail query relevance model 370 to modify labels 447 of training event samples 446 derived from tail queries 328. In the event that a training event sample 446 is detected as being a tail query 328, an initial label 447 may be generated using the hybrid labeling procedure 441 described above, and the initial label 447 can be multiplied by a relevance score 471 generated by the tail query relevance model 370 to adjust the value of the label 447.

The manner in which the tail query relevance model 370 generates the relevance scores 471 can vary. Any known technique can be used to generate a relevance score for a tail query 328. In certain embodiments, the tail query relevance model 370 utilizes a binary classifier to compute the relevance scores 471, and the relevance scores 471 generated by the tail query relevance model 370 can be values that range between zero and one.

As demonstrated herein, the training procedure 440 utilized to train the personalized ranking model 360 incorporates several improvements to enhance personalization and contextualization of search result rankings. One improvement relates to the usage of raw search event data 431, which indicates how each user previously engaged or interacted with items 310 included in search results 380, during training. Another improvement relates to the hybrid labeling of training event samples 446 in manner that accounts for individualized personalization preferences and global item popularity. Another improvement relates to how the relevance scores 471 generated by the tail query relevance model 370 can further enhance ranking of search results 380 in scenarios involving tail queries 328. These and other improvements permit the machine learning architecture 350 to optimize the ranking of search results 380.

FIG. 7 illustrates a flow chart for an exemplary method 700, according to certain embodiments. Method 700 is merely exemplary and is not limited to the embodiments presented herein. Method 700 can be employed in many different embodiments or examples not specifically depicted or described herein. In some embodiments, the activities of method 700 can be performed in the order presented. In other embodiments, the activities of method 700 can be performed in any suitable order. In still other embodiments, one or more of the activities of method 700 can be combined or skipped. In many embodiments, system 300 (FIGS. 3-4), electronic platform 330 (FIG. 3-4), search engine 320 (FIGS. 3-4), and/or machine learning architecture 350 (FIGS. 3-4) can be suitable to perform method 700 and/or one or more of the activities of method 700. In these or other embodiments, one or more of the activities of method 700 can be implemented as one or more computer instructions configured to run at one or more processing modules and configured to be stored at one or more non-transitory memory storage modules. Such non-transitory memory storage modules can be part of a computer system such as system 300 (FIGS. 3-4), electronic platform 330 (FIG. 3-4), search engine 320 (FIGS. 3-4), and/or machine learning architecture 350 (FIGS. 3-4). The processing module(s) can be similar or identical to the processing module(s) described above with respect to computer system 100 (FIG. 1) and/or system 300 (FIGS. 3 and 4).

Method 700 can comprise an activity 710 of storing search event data and ranking features in one or more databases in response to receiving search queries at a search engine.

Method 700 can further comprise an activity 720 of generating a training dataset comprising training event samples using the search event data and the ranking features.

Method 700 can further comprise an activity 730 of executing a hybrid labeling procedure that assigns labels to the training event samples based on individual engagement information associated with the training event samples. In certain embodiments, this can include applying a first set of labels to a first portion of the training event samples determined to have positive engagement. The first set of labels can be assigned to the training event samples based engagement activity types. This can further include applying a second set of labels to a second portion of the training event samples that have negative engagement. The second set of labels can be assigned to the training event samples based on aggregated engagement information.

Method 700 can further comprise an activity 740 of utilizing relevance scores to adjust labels for training event samples that corresponds to tail queries. The relevance scores can be generated by the tail query relevance model described herein.

Method 700 can further comprise an activity 750 of training a personalized ranking model to rank search results using the training event samples and the labels. As mentioned above, in some cases, the personalized ranking model can be implemented with a GBT learning model that uses pairwise ranking to determine the ordering of the search results.

As evidenced by the disclosure herein, the techniques set forth in this disclosure are rooted in computer technologies that overcome existing problems in known search engines, including problems dealing with ranking and ordering search results. The techniques described in this disclosure provide a technical solution (e.g., one that utilizes various machine learning techniques) for overcoming the limitations associated with known techniques. Amongst other things, this technology solution includes a procedure for training a machine learning architecture in a manner that permits search results to be ranked according to individual user preferences and global item popularity.

In certain embodiments, the techniques described herein can advantageously improve user experiences with electronic platforms by presenting personalized search results with high relevancy. In various embodiments, the techniques described herein can be executed dynamically in real time by an electronic platform. In many embodiments, the techniques described herein can be used continuously at a scale that cannot be reasonably performed using manual techniques or the human mind (e.g., due to processing large numbers of training event samples, and performing other complex operations executed by the machine learning architecture). The data analyzed by the machine learning techniques described herein can be too large to be analyzed using manual techniques.

Furthermore, in a number of embodiments, the techniques described herein can solve a technical problem that arises only within the realm of computer networks, because machine learning does not exist outside the realm of computer networks.

Although systems and methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIG. 7 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, cause the one or more processors to perform operations comprising:
      in response to receiving search queries at a search engine, storing search event data and ranking features in one or more databases, wherein the ranking features are stored separately from the search event data;
      prior to generating a training dataset, supplementing the search event data with ranking feature values of the ranking features, wherein the ranking feature values were previously utilized to generate previous search results when the search queries were submitted;
      generating, using the search event data supplemented with the ranking feature values of the ranking features, the training dataset comprising training event samples;
      executing a hybrid labeling procedure that assigns labels to the training event samples based, at least in part, on individual engagement information associated with the training event samples, wherein executing the hybrid labeling procedure comprises:
         generating, via a deep learning model, respective relevance scores for the search queries that are tail queries;
         applying a first set of labels of the labels to a first portion of the training event samples determined to have positive engagement, the first set of labels being assigned to the first portion of the training event samples based on engagement activity types;
         applying a second set of labels of the labels to a second portion of the training event samples that have negative engagement, the second set of labels being assigned to the second portion of the training event samples based on aggregated engagement information for items across global users, wherein the aggregated engagement information is based on a frequency of engagement by the global users on a global scale, and wherein the second set of labels are not eliminated and are assigned lower values than the first set of labels in search results; and
         adjusting a subset of the first set of labels and the second set of labels that are associated with the tail queries based on the respective relevance scores associated with the tail queries; and
      training a personalized ranking model to rank the search results using the training event samples and the labels.

2. The system of claim 1, wherein generating the respective relevance scores associated with the tail queries further comprises:
   for each training event sample, determining whether a corresponding search query is a tail query of the tail queries; and
   in response to determining that the corresponding search query is the tail query, utilizing machine learning via a binary classifier of an XGBoost model to generate a relevance score of the relevance scores associated with the tail query.

3. The system of claim 1, wherein the training event samples and the labels enable the personalized ranking model to rank the search results based on a combination of individual user preferences and global item popularity.

4. The system of claim 1, wherein applying the first set of labels to the first portion of the training event samples determined to have positive engagement comprises:
   assigning a first label to the training event samples if corresponding items associated with the training event samples resulted in an order event;
   assigning a second label to the training event samples if corresponding items associated with the training event samples resulted in an add to cart event; and
   assigning a third label to the training event samples if corresponding items associated with the training event samples resulted in a click event.

5. The system of claim 4, wherein:
   the first label, the second label, and the third label include predetermined values;
   the first label includes a predetermined value greater than the second label and the third label; and
   the third label includes a second predetermined value less than the first label and the second label.

6. The system of claim 1, wherein applying the second set of labels to the second portion of the training event samples that have negative engagement includes using the ranking features to determine the aggregated engagement information.

7. The system of claim 1, wherein:
   each of the training event samples utilized to train the personalized ranking model comprises:
      a) a search query that was submitted to the search engine;
      b) a user that submitted the search query;
      c) an item identifier identifying an item that was previously presented in response to the search query;
      d) individual engagement information corresponding to an interaction with the item by the user; and
      e) ranking features that were utilized to determine an item ranking for the item.

8. The system of claim 1, wherein the ranking features at least include one of:
   one or more click engagement features indicating or predicting a global popularity of an item based on aggregated user engagement;
   one or more brand affinity features indicating or predicting an affinity of a brand or company that provides an item;
   one or more price affinity features indicating or predicting an affinity to a price range of an item;
   one or more title similarity features indicating or predicting a similarity between a search query and an item title; or
   one or more localized engagement features indicating or predicting a popularity of an item in a local market area or geographic location based on user engagement.

9. The system of claim 1, wherein the first set of labels are applied to the first portion of the training event samples in response to detecting order events, click events, or add to cart events in the first portion of the training event samples.

10. The system of claim 9, wherein the second set of labels are applied to the second portion of the training event samples in response to determining that items identified in the second portion of the training event samples were not engaged by users.

11. A method implemented via execution of computing instructions configured to run at one or more processors and configured to be stored on non-transitory computer-readable media, the method comprising:
   in response to receiving search queries at a search engine, storing search event data and ranking features in one or more databases, wherein the ranking features are stored separately from the search event data;
   prior to generating a training dataset, supplementing the search event data with ranking feature values of the ranking features previously utilized to generate previous search results corresponding to the search queries;
   generating, using the search event data supplemented with the ranking feature values of the ranking features, the training dataset comprising training event samples;
   executing a hybrid labeling procedure that assigns labels to the training event samples based, at least in part, on individual engagement information associated with the training event samples, wherein executing the hybrid labeling procedure comprises:
      generating, via a deep learning model, respective relevance scores for the search queries that are tail queries;
      applying a first set of labels of the labels to a first portion of the training event samples determined to have positive engagement, the first set of labels being assigned to the first portion of the training event samples based on engagement activity types;
      applying a second set of labels of the labels to a second portion of the training event samples that have negative engagement, the second set of labels being assigned to the second portion of the training event samples based on aggregated engagement information for items across global users, wherein the aggregated engagement information is based on a frequency of engagement by the global users on a global scale, and wherein the second set of labels are not eliminated and are assigned lower values than the first set of labels in search results; and
      adjusting a subset of the first set of labels and the second set of labels that are associated with the tail queries based on the respective relevance scores associated with the tail queries; and
   training a personalized ranking model to rank the search results using the training event samples and the labels.

12. The method of claim 11, wherein generating the respective relevance scores associated with the tail queries further comprises:
   for each training event sample, determining whether a corresponding search query is a tail query of the tail queries; and
   in response to determining that the corresponding search query is the tail query, utilizing machine learning via a binary classifier of an XGBoost model to generate a relevance score of the relevance scores associated with the tail query.

13. The method of claim 11, wherein the training event samples and the labels enable the personalized ranking model to rank the search results based on a combination of individual user preferences and global item popularity.

14. The method of claim 11, wherein applying the first set of labels to the first portion of the training event samples determined to have positive engagement comprises:
   assigning a first label to the training event samples if corresponding items associated with the training event samples resulted in an order event;
   assigning a second label to the training event samples if corresponding items associated with the training event samples resulted in an add to cart event; and
   assigning a third label to the training event samples if corresponding items associated with the training event samples resulted in a click event.

15. The method of claim 14, wherein:
   the first label, the second label, and the third label include predetermined values;
   the first label includes a predetermined value greater than the second label and the third label; and
   the third label includes a second predetermined value less than the first label and the second label.

16. The method of claim 11, wherein applying the second set of labels to the second portion of the training event samples that have negative engagement includes using the ranking features to determine the aggregated engagement information.

17. The method of claim 11, wherein:
   each of the training event samples utilized to train the personalized ranking model comprises:
      a) a search query that was submitted to the search engine;
      b) a user that submitted the search query;
      c) an item identifier identifying an item that was previously presented in response to the search query;
      d) individual engagement information corresponding to an interaction with the item by the user; and
      e) ranking features that were utilized to determine an item ranking for the item.

18. The method of claim 11, wherein the ranking features at least include one of:
   one or more click engagement features indicating or predicting a global popularity of an item based on aggregated user engagement;
   one or more brand affinity features indicating or predicting an affinity of a brand or company that provides an item;
   one or more price affinity features indicating or predicting an affinity to a price range of an item;
   one or more title similarity features indicating or predicting a similarity between a search query and an item title; or
   one or more localized engagement features indicating or predicting a popularity of an item in a local market area or geographic location based on user engagement.

19. The method of claim 11, wherein the first set of labels are applied to the first portion of the training event samples in response to detecting order events, click events, or add to cart events in the first portion of the training event samples.

20. The method of claim 19, wherein the second set of labels are applied to the second portion of the training event samples in response to determining that items identified in the second portion of the training event samples were not engaged by users.

* * * * *